US009363635B2

(12) United States Patent
Finlow-Bates et al.

(10) Patent No.: US 9,363,635 B2
(45) Date of Patent: Jun. 7, 2016

(54) OBTAINING A GEO-FENCE WITHOUT A NETWORK DOWNLOAD (71) Applicant: QUALCOMM Incorporated, San Diego, CA (US)

(72) Inventors: Keir Finlow-Bates, Kangasala (FI); Joonas Veikko Taneli Viskari, Lempaala (FI)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 13/672,273

(22) Filed: Nov. 8, 2012

(65) Prior Publication Data

US 2014/0128095 A1    May 8, 2014

(51) Int. Cl.
H04M 1/66 (2006.01)
H04M 1/68 (2006.01)
H04M 3/16 (2006.01)
H04W 4/02 (2009.01)
H04L 29/08 (2006.01)
H04W 4/00 (2009.01)

(52) U.S. Cl.
CPC ............... *H04W 4/021* (2013.01); *H04L 67/26* (2013.01); *H04W 4/008* (2013.01)

(58) Field of Classification Search
CPC ....... H04W 64/00; H04W 4/02; H04W 12/06; H04W 12/12; H04L 29/08657; H04L 63/08; G01S 5/0252; G01S 5/02
USPC ............ 455/456.1, 411; 340/539.13; 235/385
See application file for complete search history.

(56) References Cited

U.S. PATENT DOCUMENTS

| 6,785,551 | B1 | 8/2004 | Richard | |
|---|---|---|---|---|
| 7,637,810 | B2 | 12/2009 | Amaitis et al. | |
| 8,019,532 | B2 | 9/2011 | Sheha et al. | |
| 8,229,473 | B1 | 7/2012 | De La Rue | |
| 2006/0145837 | A1* | 7/2006 | Horton et al. | 340/539.13 |
| 2006/0197658 | A1 | 9/2006 | Light et al. | |
| 2007/0210156 | A1* | 9/2007 | Bochicchio | 235/385 |
| 2010/0148947 | A1 | 6/2010 | Morgan et al. | |
| 2010/0289644 | A1 | 11/2010 | Slavin et al. | |
| 2012/0094685 | A1 | 4/2012 | Marsico | |
| 2013/0150002 | A1* | 6/2013 | Croy et al. | 455/411 |
| 2014/0128095 | A1* | 5/2014 | Finlow-Bates et al. | 455/456.1 |

OTHER PUBLICATIONS

International Search Report and Written Opinion—PCT/US2013/068909—ISA/EPO—Jan. 8, 2014.

* cited by examiner

*Primary Examiner* — William D Cumming
(74) *Attorney, Agent, or Firm* — Muncy, Geissler, Olds & Lowe, P.C.

(57) ABSTRACT

Methods and systems for providing and obtaining a geo-fence without a network download are disclosed. An embodiment generates geo-fence parameters and encodes the geo-fence parameters on a portable storage media, wherein the geo-fence parameters are transferred to a location-enabled mobile device when the location-enabled mobile device scans the portable storage media. An embodiment scans, by a location-enabled mobile device, a portable storage media, wherein the portable storage media stores geo-fence parameters, and wherein scanning the portable storage media transfers the geo-fence parameters to the location-enabled mobile device. An embodiment includes a non-transitory portable storage media comprising geo-fence parameters, including a perimeter of a geo-fence and one or more alert conditions associated with the perimeter of the geo-fence, wherein scanning the portable storage media transfers the geo-fence parameters to a location-enabled mobile device.

52 Claims, 7 Drawing Sheets

GEOF:C(61.447091,23.858292,120);ALERT(entry,exit)

FIG. 4

GEOF:P(61.447022,23.856715;61.445052,23.858080;61.446681,23.866253;
61.448789,23.865046;61.448813,23.860471);ALERT(in:10800,out:280)

FIG. 5

GEOF:P(61.447022,23.856715;61.445052,23.858080;61.446681,23.866253;
61.448789,23.865046;61.448813,23.860471);P(61.447620,23.859805;
61.448586,23.857477;61.446829,23.856491);ALERT(exit)

OBTAINING A GEO-FENCE WITHOUT A NETWORK DOWNLOAD

BACKGROUND OF THE INVENTION

1. Field of the Invention

The disclosure is directed to obtaining a geo-fence without a network download.

2. Description of the Related Art

When a cell phone user is near the boundary of a geo-fence and the geo-fence is relevant to the user, the user may wish to load the geo-fence onto the cell phone (or any other mobile device capable of determining its geographic location). Typically, the cell phone must establish a network connection in order to download the geo-fence. However, the cell phone may not be able to establish a network connection, or the user may not wish to establish a network connection. Further, the user may not be aware that a geo-fence is available for that location.

Accordingly, it would be beneficial if the user were presented with a sign near the geo-fenced area that indicated that a geo-fence is available and provided a way to obtain the geo-fence parameters without requiring a network connection.

SUMMARY

The disclosure is directed to providing and obtaining a geo-fence without a network download. An embodiment generates geo-fence parameters and encodes the geo-fence parameters on a portable storage media, wherein the geo-fence parameters are transferred to a location-enabled mobile device when the location-enabled mobile device scans the portable storage media. An embodiment scans, by a location-enabled mobile device, a portable storage media, wherein the portable storage media stores geo-fence parameters, and wherein scanning the portable storage media transfers the geo-fence parameters to the location-enabled mobile device. An embodiment includes a non-transitory portable storage media comprising geo-fence parameters, including a perimeter of a geo-fence and one or more alert conditions associated with the perimeter of the geo-fence, wherein scanning the portable storage media transfers the geo-fence parameters to a location-enabled mobile device.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or "UT," a "mobile terminal," a "mobile station" and variations thereof. Generally, UEs can communicate with a core network via the RAN, and through the core network, the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Figure 1:
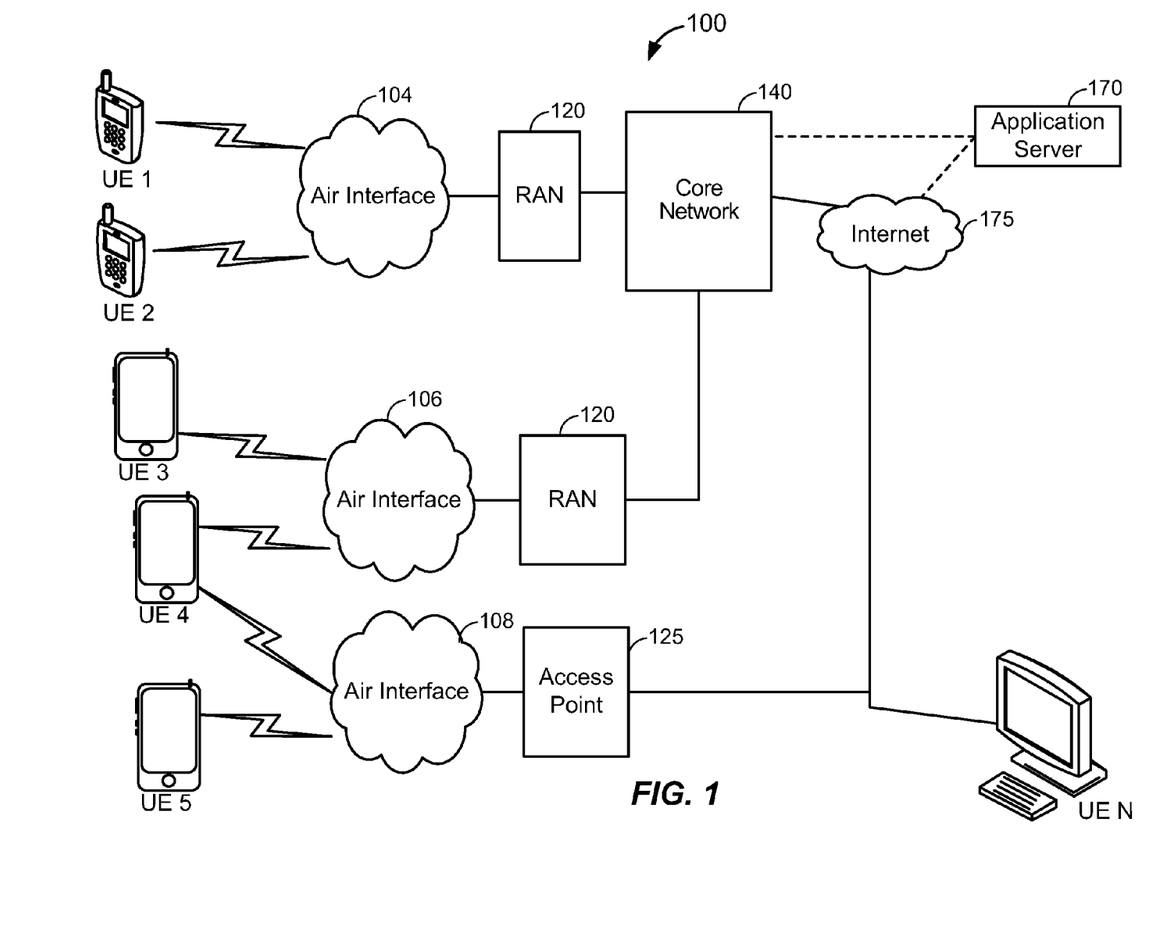
FIG. 1 illustrates a high-level system architecture of a wireless communications system in accordance with an embodiment of the invention.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with a RAN 120 over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is an access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 2:
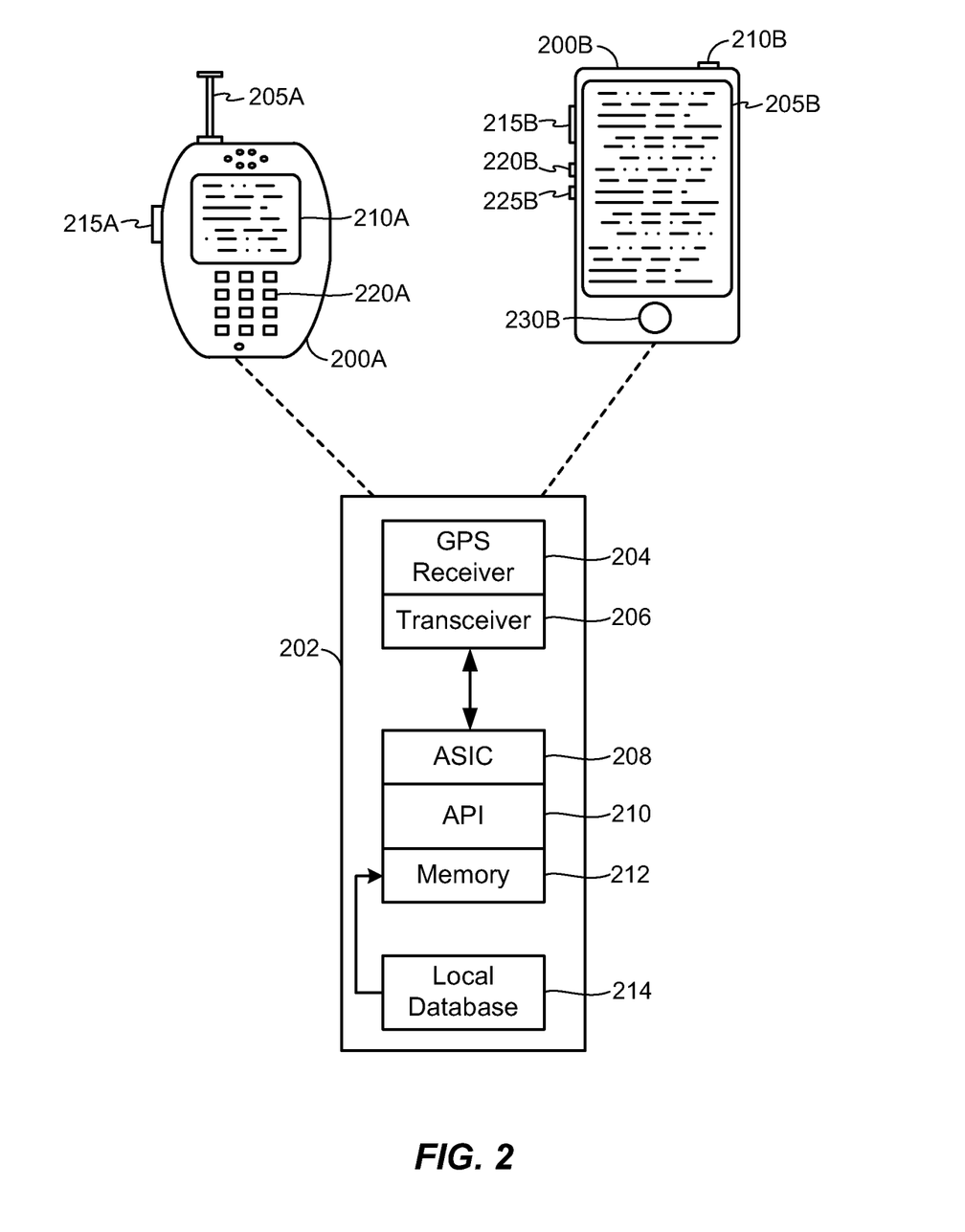
FIG. 2 illustrates examples of user equipments (UEs) in accordance with embodiments of the invention.

FIG. 2 illustrates examples of UEs in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web uniform resource locators (URLs), etc.). The platform 202 can also independently execute locally stored applications without RAN interaction. The platform 202 can include a GPS receiver 204 (or other receiver for satellite navigation) and transceiver 206 operably coupled to an ASIC 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only memory (ROM) or random-access memory (RAM), electrically erasable programmable ROM (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

The UEs 200A and 200B can obtain their geographic position via various satellite-based positioning systems known in the art, such as GPS, assisted GPS (A-GPS), SPS, GLONASS, etc. The UEs 200A and 200B may also augment the satellite-based positioning with terrestrial radio frequency (RF) signals, such as wide area augmentation system (WAAS), differential global positioning system (DGPS), etc., as is known in the art. The UEs 200A and 200B may also use an inertial navigation system (INS) to determine or augment its position. A UE that can determine its geographic position, such as UEs 200A and 200B, is a location-enabled UE. In this disclosure, the terms "geographic location" and "geographic position" are used interchangeably.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs 200A and 200B from the RAN using a variety of networks and configurations. Accordingly, the illustrations provided herein are not intended to limit the embodiments of the invention and are merely to aid in the description of aspects of embodiments of the invention.

Figure 3:
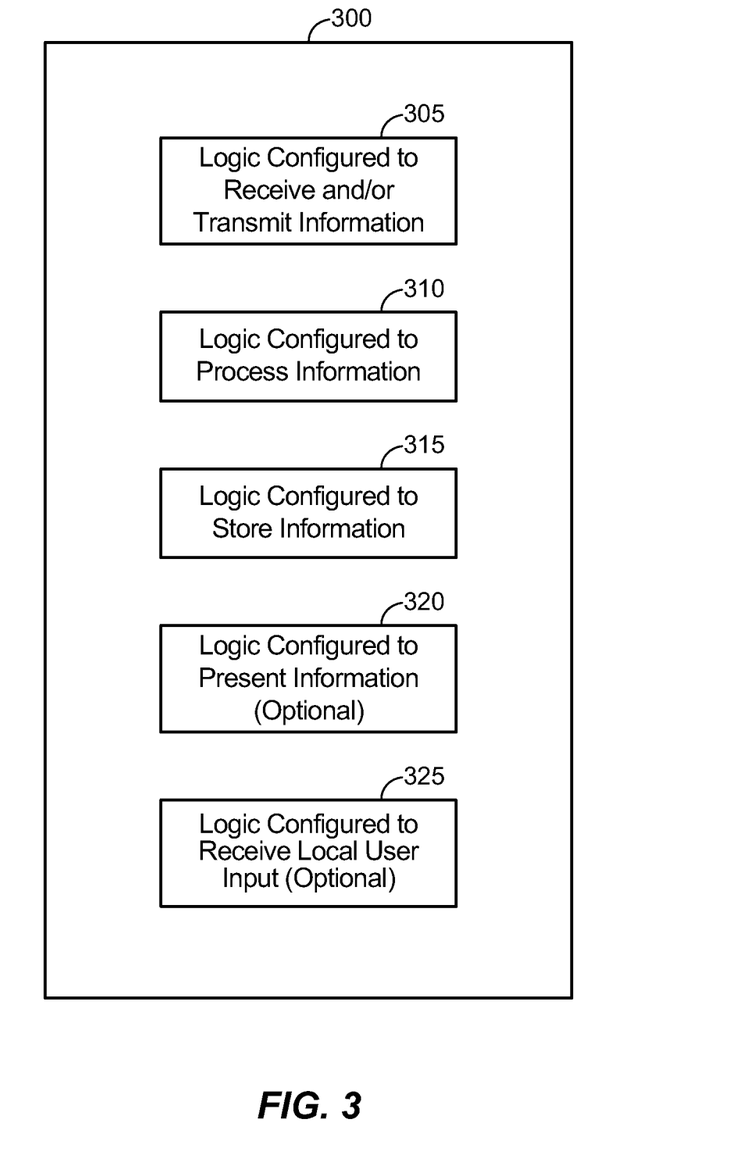
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., a radio frequency (RF) antenna, a MODEM, a modulator and/or demodulator, etc.). In another example, the logic configured to receive and/or transmit information 305 can correspond to a wired communications interface (e.g., a serial connection, a universal serial bus (USB) or Firewire connection, an Ethernet connection through which the Internet 175 can be accessed, etc.). Thus, if the communication device 300 corresponds to some type of network-based server (e.g., the application server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, erasable programmable ROM (EPROM) memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, high-definition multimedia interface (HDMI), etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

When a cell phone user is near the boundary of a geo-fence and the geo-fence is relevant to the user, the user may wish to load the geo-fence onto the cell phone (or any other mobile device capable of determining its geographic position, i.e. a location-enabled mobile device). Typically, the cell phone must establish a network connection in order to download the geo-fence. However, the cell phone may not be able to establish a network connection, or the user may not wish to establish a network connection. Further, the user may not be aware that a geo-fence is available for that location.

Accordingly, it would be beneficial if the user was presented with a sign near the geo-fenced area that indicated that a geo-fence is available and provided a way to obtain the geo-fence parameters without requiring a network connection.

The various embodiments provide a matrix barcode, such as a quick response (QR) code, a radio-frequency identification (RFID) tag, a near field communication (NFC) transmitter, or other similar storage media, that stores the parameters of a geo-fence. Such a storage media does not require the UE to connect to a network in order to read the media or obtain the geo-fence parameters. The media can be affixed to or printed on a sign, which can describe the geo-fence and include any other information desired by the sign-poster. One or more such signs can be positioned at or near the entrance(s) to or boundaries of the geo-fence and/or at various locations within the geo-fence.

The parameters of the geo-fence can include not only the boundaries of the geo-fence, but also one or more alert conditions associated with the geo-fence, such as an entering breach, an exiting breach, an alert for remaining within a boundary for more than a specified time, an alert for leaving a boundary for more than a specified time, an alert for entering or exiting a boundary at the wrong time of the day/week/month/year, etc.

The various embodiments may be beneficial in a number of different types of situations. For example, the storage media could be affixed to signs placed at the entrance(s) to private property, such as a stately home, parklands of a palace or castle, privately owned lands with limited public access, etc., or a public building with limited access to certain areas, such as a museum, hospital, or government office. The geo-fence could be quite complicated, marking out pathways, corridors, rooms, fields, and/or other areas where access is permitted, surrounded by private areas where access is not permitted. The geo-fence could be used to trigger an alert if the visitor leaves a public area and enters a restricted access area, therefore committing a trespass.

As another example, a user may wish to know if his or her car is removed from a parking lot without permission, but may not care if the car is moved within the lot, such as for washing or valeting. The storage media could be affixed to a sign at the entrance to the parking lot and the user could scan it with a positioning device, such as a GPS receiver, that would be left in the car. The user could obtain the receiver from the parking lot attendant, or purchase it from a third party. The receiver would track the position of the vehicle and send an alert to the user's cell phone if the car is removed from the lot.

Similarly, a positioning device can be attached to a shipping crate or other container, and as the container is loaded into a warehouse (or store/distribution center/construction site/etc.), the positioning device would scan the storage media to obtain a geo-fence of the warehouse. This process could be fully automated and performed by robotic cranes moving the containers.

In yet another example, players in a game, such as paintball, may wear positioning devices loaded with a geo-fence of the game boundaries. The positioning device may alert just the player, the game referee, or both, if the player breaches a boundary. Further, each team could have their own geo-fence boundaries, and the boundaries could change during gameplay. For instance, if a player makes it to a certain point on the game field, he or she may be able to scan another storage media to load a different geo-fence.

As another example, the storage media could be affixed to signs placed at the entrance(s) to a store. Upon entering the store, shoppers could scan the storage media to obtain the geo-fence, which would include boundaries near the entrances and exits to the store. When a shopper crosses the boundary, he or she would receive a reminder to check that he or she is not accidentally leaving the shopping floor without clearing any goods at the checkout, thus preventing inadvertent shoplifting.

As yet another example, an amusement park may provide different ticket prices for different areas of the park. Upon entering the park, visitors could scan the storage media and obtain a geo-fence defining the boundaries of the park to which the visitors' tickets give access. The geo-fence parameters may also define a period of time for which the visitors' ticket is valid, and alert the visitors, or park operators, if the visitors remain in an area longer than the time for which they paid. The period of time could be a specific number of hours, days, weeks, etc., or a time of the day, week, month, etc.

The various embodiments also provide for encryption so that a user cannot make and scan their own QR code (or RFID tag or NFC transmitter) to cheat the system. In the amusement park example, for instance, encryption would prevent a visitor from purchasing a cheap ticket to enter the park then scanning a counterfeit QR code that would give the visitor access to more of the park than he or she paid for. Likewise, in the parking lot example, encryption would prevent a car thief from breaking into a car and scanning a counterfeit QR code that would alter the previously stored geo-fence parameters (e.g. removing the alarm parameters, changing the geographic area, etc.).

The foregoing are merely examples of situations in which the various embodiments could be beneficial. It is apparent that there are many other situations in which the various embodiments would be beneficial, and accordingly this disclosure is not limited to the examples given.

As discussed above, the various embodiments present geo-fence description data for optical scanning using a matrix barcode, for wireless reading using an RFID tag, or for wireless reading using an NFC transmitter. In practice, RFID tags and NFC transmitters are very similar. The distinction is that an NFC transmitter permits two-way communication. This allows the user to be prompted for information, such as choosing which geo-fence to select or which alert method to use, and in response, to receive the relevant data from the same transmitter. In contrast, communication with an RFID tag is one-way. As such, to present the user with options, the user would have to be presented with multiple RFID tags, and it would be up to the user to select the right one.

All three systems have the advantage that they do not require a power source to run. Specifically, matrix barcodes are ink on paper and RFID tags and NFC transmitters are powered by radio waves from the device scanning them. While the exemplary embodiments are generally described with reference to matrix barcodes, the RFID tag and NFC transmitter embodiments are the same except that the data delivery method is different (i.e. radio waves instead of optical).

The geo-fence can be traced on a map and the coordinates encoded into a text string used to generate the matrix barcode or provided as a data packet in an RFID tag or NFC transmitter. The coordinates can be encoded in one or more of a variety of ways, such as:

1. A center point with longitude, latitude, and a radius defining a circle.
2. Top-left and bottom-right latitude and longitude coordinates defining a rectangle and an angle specifying the orientation of the rectangle.
3. A set of x-y latitude and longitude coordinates defining the vertices of a convex polygon.
4. A reference point given by latitude and longitude and the remaining points defined relative to the reference point (which reduces the data size of the coordinates).
5. A collection or set of convex polygons defined as in (4), which when added together give one or more complex polygonal shapes, which may or may not be convex and may or may not overlap or touch.
6. A collection or set of vertex points, and functions that define curves between each pair of vertices.

Figure 4:
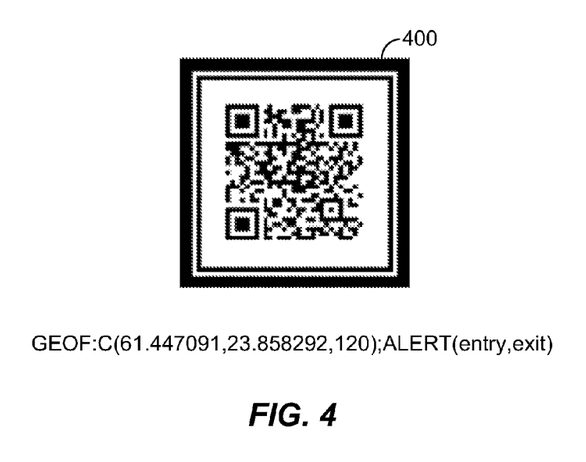
FIG. 4 illustrates an exemplary quick response (QR) code according to an embodiment.

FIG. 4 illustrates an exemplary QR code 400 according to an embodiment. QR code 400 encodes the text string:
 GEOF:C(61.447091,23.858292,120);ALERT(entry,exit)
This text string is a geo-fence packet and defines a circular (indicated by the "C") geo-fence centered on 61.447091 North, 23.858292 East, having a radius of 120 meters, and an alert set for if the device enters or exists the geo-fence perimeter.

Figure 5:
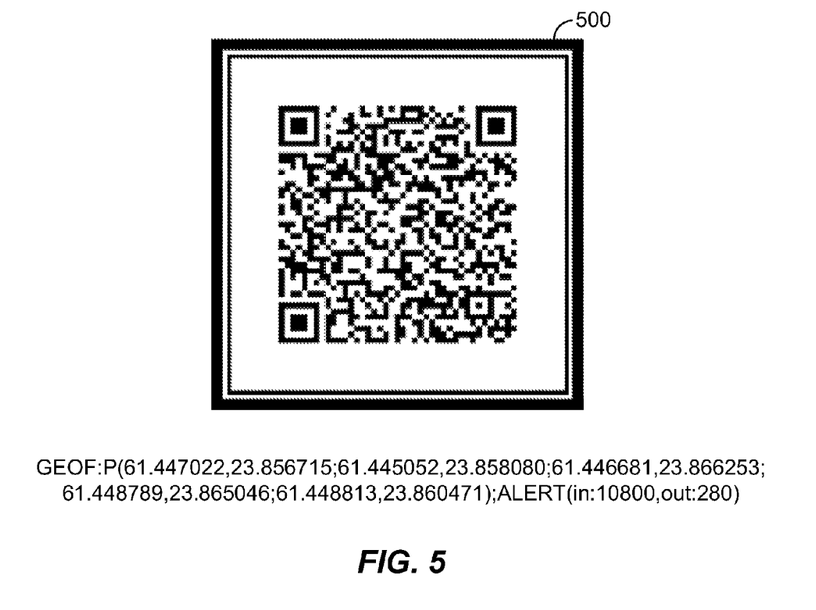
FIG. 5 illustrates an exemplary QR code according to an embodiment.

FIG. 5 illustrates an exemplary QR code 500 according to an embodiment. QR code 500 encodes the text string:
 GEOF:P(61.447022,23.856715;61.445052,23.858080;
  61.446681,23.866253; 61.448789,23.865046;
  61.448813,23.860471);ALERT(in:10800,out:280)
This text string/geo-fence packet defines a polygonal (as indicated by the "P") geo-fence with five vertices, and an alert set for if the device remains within the geo-fence perimeter for more than 10800 seconds, or if the device is outside the geo-fence for more than 280 seconds.

Figure 6:
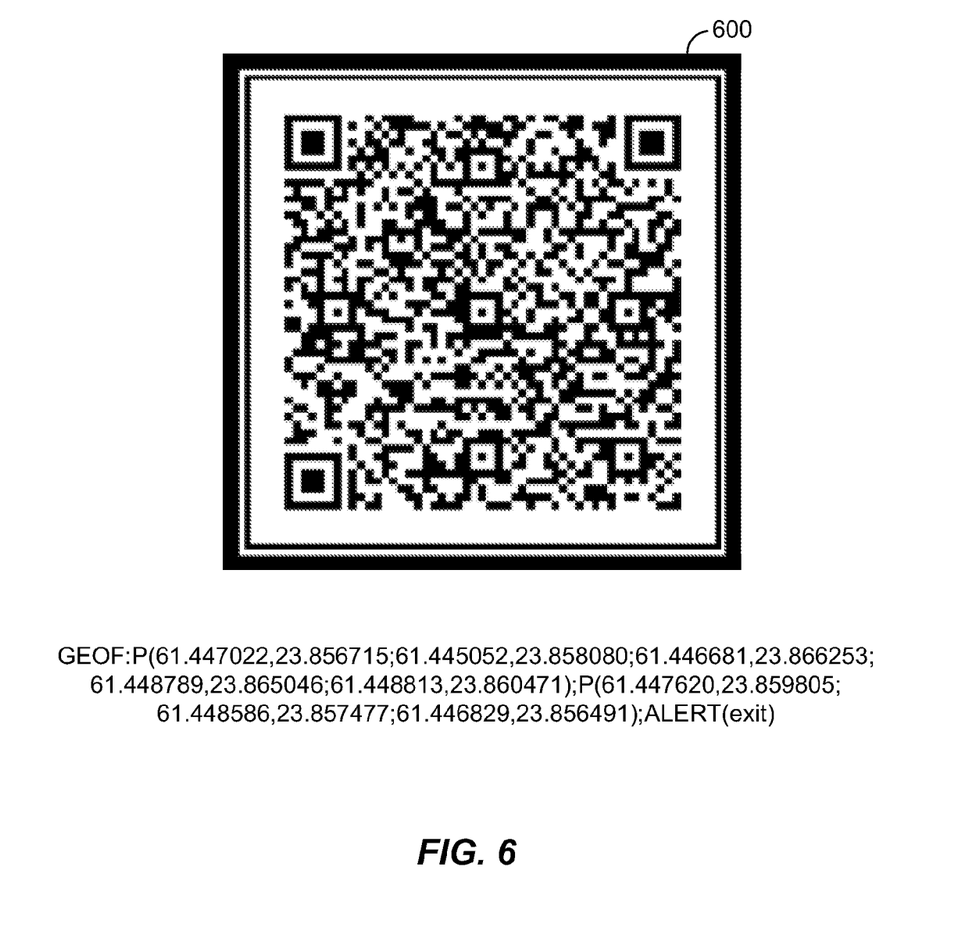
FIG. 6 illustrates an exemplary QR code according to an embodiment.

FIG. 6 illustrates an exemplary QR code 600 according to an embodiment. QR code 600 encodes the text string:
 GEOF:P(61.447022,23.856715;61.445052,23.858080;
  61.446681,23.866253; 61.448789,23.865046;
  61.448813,23.860471);P(61.447620,23.859805;
  61.448586,23.857477;61.446829,23.856491);ALERT
  (exit)
This text string/geo-fence packet defines two polygons and an alert set for if the device exits the geo-fence perimeter.

Figure 7:
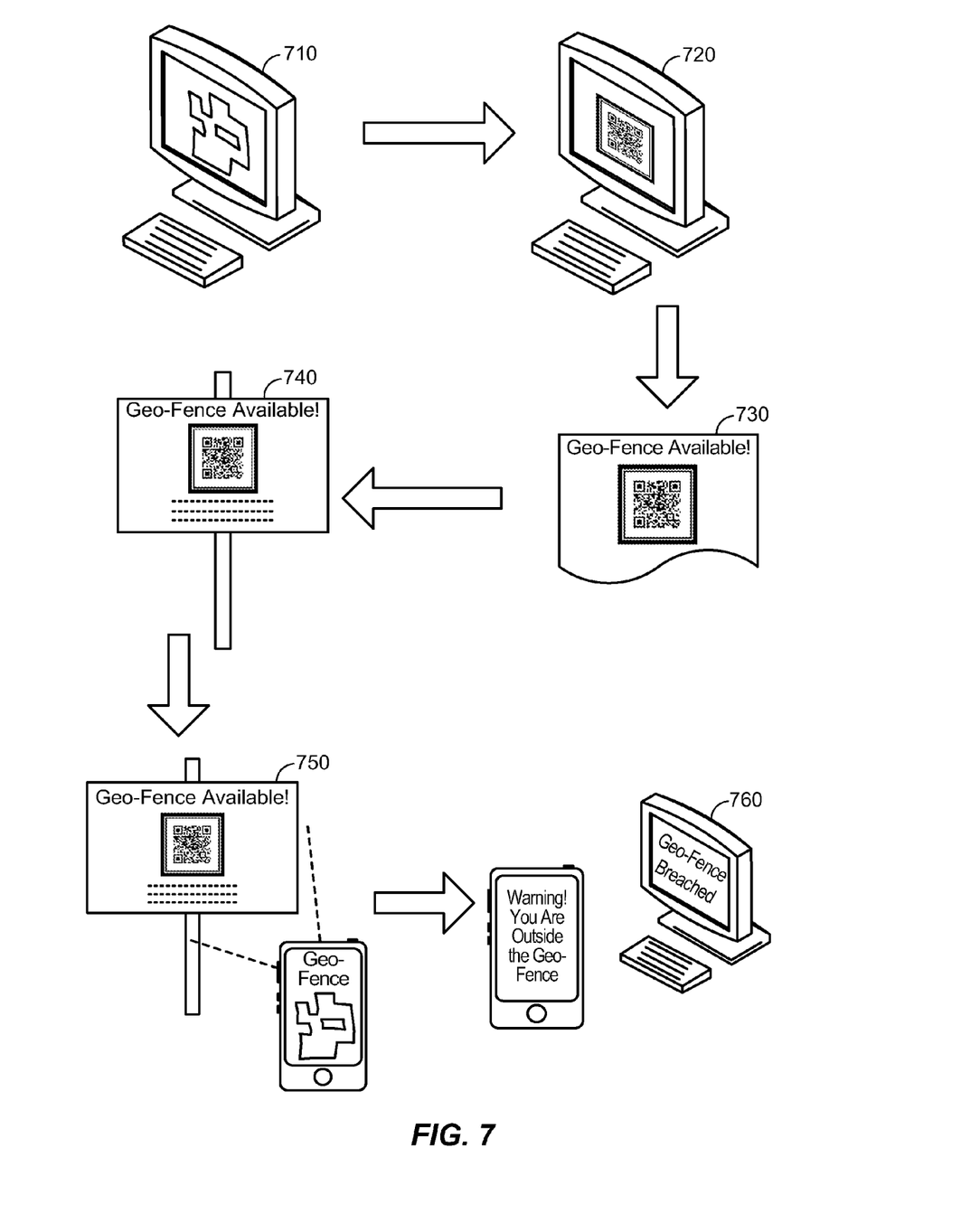
FIG. 7 illustrates an exemplary flow of an embodiment.

FIG. 7 illustrates an exemplary flow of an embodiment. At 710, a user generates a geo-fence of a given area using a computer-aided design (CAD) application. The user may trace the boundaries of the geo-fence on a map of the given area to define the perimeter of the geo-fence. Alternatively or additionally, the user may mark certain points on the map and select the shape defined at or by those points, such as a line, circle, rectangle, or polygon. The user also defines any other parameters of the geo-fence, such as the alerts.

At 720, the application converts the geo-fence parameters to a matrix barcode, here a QR code. Although FIG. 7 illustrates the geo-fence parameters encoded as a QR code, the application can convert the geo-fence parameters to any matrix barcode or a data packet for an RFID tag or an NFC transmitter instead, or additionally. Such a data packet could then be loaded onto the RFID tag or NFC transmitter.

At 730, the user prints the QR code on one or more signs. Alternatively, the user could print the QR code as a sticker and affix it to the sign(s). If the geo-fence parameters are encoded in an RFID tag or an NFC transmitter, the RFID tag or NFC transmitter could be attached to the sign(s) by an adhesive.

At 740, the user posts the sign(s) at one or more locations near the boundaries of the geo-fence. For example, the user may place signs at the entrance(s), exit(s), and/or off-limits areas.

At 750, a visitor scans the QR code (or RFID tag or NFC transmitter) with his or her UE to obtain the geo-fence parameters. The UE converts the scanned geo-fence parameters to a format the UE can compare to its current position. The UE may obtain its position via any UE positioning system known in the art, such as GPS, A-GPS, SPS, GLONASS, etc. The UE may also augment the satellite-based positioning with terrestrial RF signals, such as WAAS, DGPS, etc., as is known in the art. The UE begins periodically comparing its position with the geo-fence boundaries.

At 760, the UE detects that it has satisfied the alert condition(s) obtained in the geo-fence parameters. In the example of FIG. 7, the geo-fence parameters include an exit alert and the UE has satisfied the alert condition by leaving the geo-fence boundary. The UE issues the alert, which may be displayed to the user on the UE's UI, and/or transmitted to a third-party, such as a security officer for the geo-fenced area.

There are a number of ways the geo-fence parameters can be removed from the UE. The user may delete the geo-fence from the UE via the UI, or the user may scan another QR code (or RFID tag or NFC transmitter) near the exit of the geo-fenced area that instructs the UE to delete the geo-fence parameters. Alternatively, the geo-fence parameters may expire after a period of time, or the UE may automatically delete the geo-fence parameters once it is a threshold distance away from the geo-fence. Alternatively, a third party may signal the UE to delete the geo-fence parameters.

Figure 8:
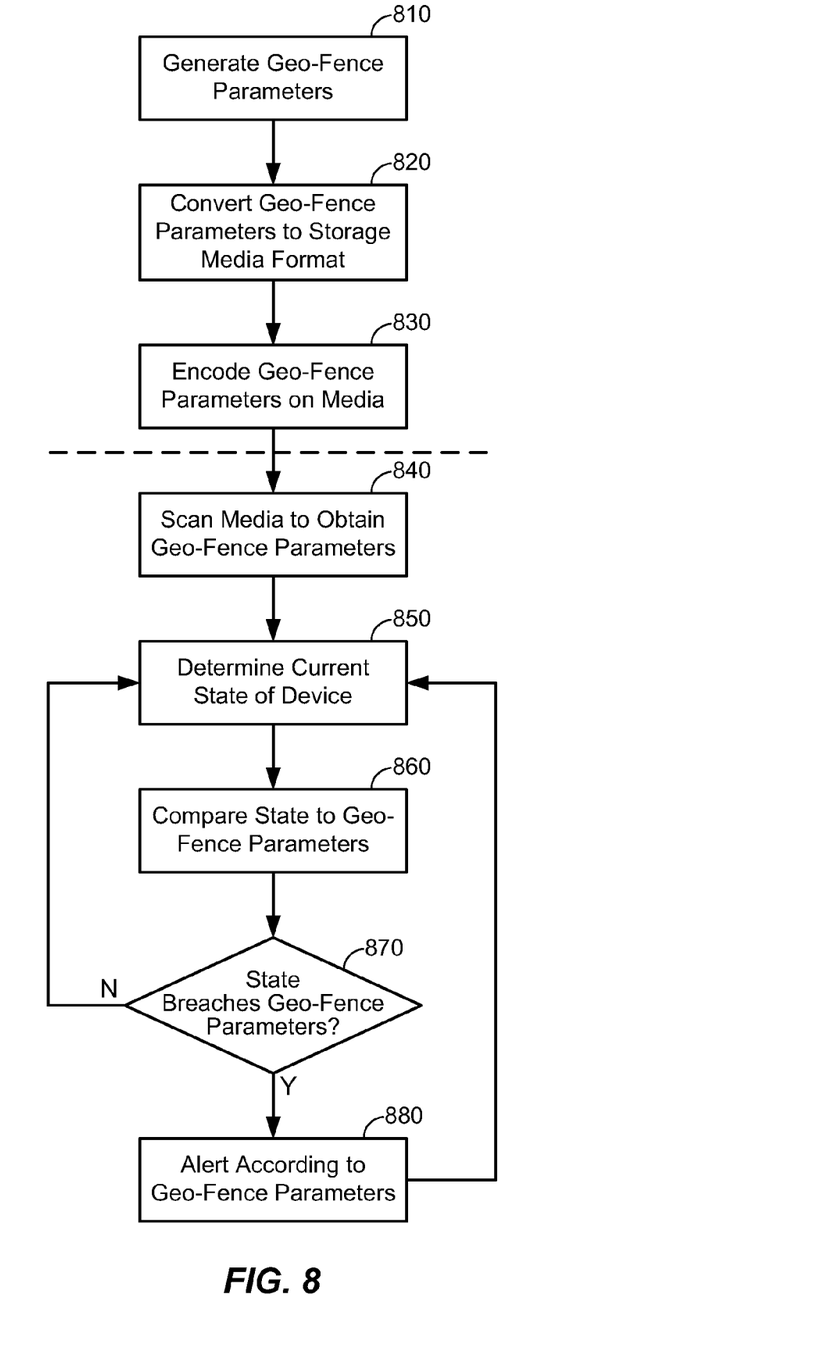
FIG. 8 illustrates an exemplary flow of an embodiment.

FIG. 8 illustrates an exemplary flow of an embodiment. At 810, an application generates geo-fence parameters based on information received from a user. The information may include coordinates of a freehand tracing on a map of a given area and/or one or more points on the map and a shape defined at or by those points, such as a line, circle, rectangle, or polygon. The information may include other parameters of the geo-fence, such as the alert conditions.

At 820, the application converts the geo-fence parameters to a matrix barcode, RFID data packet, NFC data packet, and/or other similar storage media data packet. At 830, the application prints the matrix barcode and/or encodes the data packet onto the RFID tag and/or NFC transmitter. Alternatively, the application may transmit the matrix barcode and/or data packet to another device to print the matrix barcode and/or encode the data packet onto the RFID tag and/or NFC transmitter.

At 840, a location-enabled wireless mobile device scans the matrix barcode, RFID tag, or NFC transmitter to obtain the geo-fence parameters. The wireless mobile device converts the scanned geo-fence parameters to a format the wireless mobile device can compare to information about its current state. The wireless mobile device may be a cell phone, tablet computer, PDA, or any other location-enabled personal wireless mobile device. Alternatively, the wireless mobile device may be a location-enabled device provided to a user by a third party for the specific purpose of tracking that user's movements within a geo-fenced area. The third party may be a vendor with no direct relation to the geo-fenced area, and the wireless mobile device may be an off-the-shelf product intended to be used for multiple different geo-fenced areas. Alternatively, the operator of the geo-fenced area may provide each visitor with a wireless mobile device, and the visitor or local personnel can scan the appropriate geo-fence storage media based on the visitor's ticket and/or purchase options.

At 850, the wireless mobile device determines its current state. The state of the wireless mobile device can include its current location, the amount of time that has elapsed since it entered or exited the geo-fence boundary, the current time, day, month, and/or year, etc. If the geo-fence parameters include an amount of time permitted inside or outside the geo-fence boundaries, the wireless mobile device may track the amount of time that has elapsed since it entered or exited the geo-fence boundary with a counter. The wireless mobile device can increment the counter from 0 or decrement the counter from the amount of time specified by the geo-fence parameter.

At 860, the wireless mobile device compares its current state to the geo-fence parameters. For instance, the wireless mobile device compares its current location to the geo-fence boundaries, the length of time permitted inside or outside the boundaries to the length of time it has been inside or outside the boundaries, the time of day/week/month/year to the time of day/week/month/year the boundaries are to be enforced, etc. For example, if the geo-fence parameters include a length of time the user is permitted to be inside the geo-fence boundaries, the wireless mobile device will compare the value of the incrementing counter to the time given in the geo-fence parameters.

At 870, the wireless mobile device determines whether its current state breaches the geo-fence parameters. In determining its position, the wireless mobile device can optionally check the accuracy of its position. If the accuracy is above a threshold, the wireless mobile device uses that location value to determine whether its current state breaches the geo-fence parameters. If the accuracy of its position is below the threshold, the wireless mobile device tries to obtain a more accurate position by, for example, augmenting the GPS signals with terrestrial RF signals and/or INS, as is known in the art. If the wireless mobile device is unable to obtain a more accurate position, it proceeds with the lower accuracy position.

If the current state of the wireless mobile device does not breach the geo-fence parameters, then the flow returns to 850. If it does, however, then the flow proceeds to 880. For example, if the wireless mobile device's current location is within the geo-fence boundaries but the counter tracking the amount of time permitted inside the geo-fence perimeter has expired (i.e. is 0 or greater than the permitted time), then the wireless mobile device determines that it has breached the geo-fence parameters.

At 880, the wireless mobile device issues an alert. The type of alert may be defined in the geo-fence parameters or by an application installed on the wireless mobile device. The alert may be displayed and/or played locally and/or remotely. A local alert may be an audible, visual, and/or tactile alert. For example, the wireless mobile device may display a message that the user is outside the geo-fence perimeter or has stayed within the perimeter too long. The message may be accompanied by a sound and/or vibration to draw the user's attention to the message.

A remote alert may be a text message, an email, a popup window, an audible, visual, or tactile alarm, etc. transmitted to and displayed on a remote device. For example, if a remote party, such as a security officer for the geo-fenced area, is monitoring users carrying wireless mobile devices loaded with the geo-fence parameters, the wireless mobile device can send the alert to the remote device. The alert can include the type of breach (e.g. entry, exit, inside time expiration, outside time expiration), the location of the breach, the time of the breach, the length of the breach (for inside-outside alerts, if the perimeter is reentered or exited), the identity of the breaching user and/or the breaching device, etc.

After the wireless mobile device issues the alert, the flow returns to 850 to determine whether the user has cured the breach, and/or to track further statistics of the breach.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for providing a geo-fence without a network download, comprising:
    generating geo-fence parameters, wherein the geo-fence parameters comprise one or more alert conditions; and
    encoding the geo-fence parameters on a portable storage media comprising a matrix barcode,
    wherein the geo-fence parameters are capable of being transferred to a location-enabled mobile device without the network download, and
    wherein the location-enabled mobile device issues an alert based on the one or more alert conditions being satisfied.

2. The method of claim 1, wherein the matrix barcode is presented on a passive device that consumes no power.

3. The method of claim 1, wherein the geo-fence parameters comprise a perimeter of the geo-fence.

4. The method of claim 1, wherein the one or more alert conditions comprise one or more of:
    entering the perimeter of the geo-fence;
    exiting the perimeter of the geo-fence;
    remaining within the perimeter of the geo-fence for more than a specified time;

leaving the perimeter of the geo-fence for more than a specified time;
entering the perimeter of the geo-fence during a specified time period; or
exiting the parameter of the geo-fence during a specified time period.

5. The method of claim 1, wherein the location-enabled mobile device issues the alert to a user of the location-enabled mobile device.

6. The method of claim 1, wherein the location-enabled mobile device issues the alert to a party monitoring the geo-fence.

7. The method of claim 1, wherein the portable storage media is placed adjacent to an area bounded by the geo-fence.

8. The method of claim 1, wherein the location-enabled mobile device is one of a cell phone, a tablet computer, or a personal digital assistant.

9. The method of claim 1, wherein a user of the location-enabled mobile device obtains the location-enabled mobile device from a vendor.

10. The method of claim 1, wherein the location-enabled mobile device is provided to a user by personnel associated with the geo-fence.

11. A method for obtaining a geo-fence without a network download, comprising:
reading, by a location-enabled mobile device, a matrix barcode; and
obtaining, by the location-enabled mobile device, geo-fence parameters based on the matrix barcode without the network download, wherein the geo-fence parameters comprise one or more alert conditions, and
issuing, by the location-enabled mobile device, an alert based on the one or more alert conditions being satisfied.

12. The method of claim 11, wherein the matrix barcode is displayed on a passive device that consumes no power.

13. The method of claim 11, wherein the geo-fence parameters comprise a perimeter of the geo-fence.

14. The method of claim 5, wherein the one or more alert conditions comprise one or more of:
entering the perimeter of the geo-fence;
exiting the perimeter of the geo-fence;
remaining within the perimeter of the geo-fence for more than a specified time;
leaving the perimeter of the geo-fence for more than a specified time;
entering the perimeter of the geo-fence during a specified time period; or
exiting the perimeter of the geo-fence during a specified time period.

15. The method of claim 5 wherein the issuing comprises issuing the alert to a user of the location-enabled mobile device.

16. The method of claim 5, wherein the issuing comprises issuing the alert to a party monitoring the geo-fence.

17. The method of claim 11, wherein the matrix barcode is placed adjacent to an area bounded by the geo-fence.

18. The method of claim 11, wherein the location-enabled mobile device is one of a cell phone, a tablet computer, or a personal digital assistant.

19. The method of claim 11, wherein a user of the location-enabled mobile device obtains the location-enabled mobile device from a vendor.

20. The method of claim 11, wherein the location-enabled mobile device is provided to a user by personnel associated with the geo-fence.

21. The method of claim 11, wherein the location-enabled mobile device is a mobile device capable of obtaining its geographic position.

22. The method of claim 21, further comprising:
determining a geographic position of the location-enabled mobile device using a global positioning system (GPS) receiver.

23. The method of claim 22, further comprising:
attempting to augment the geographic position based on an accuracy of the geographic position being less than a threshold.

24. An apparatus for providing a geo-fence without a network download, comprising:
at least one processor; and
a memory storing instructions that, when executed by the at least one processor, cause the apparatus to perform operations comprising:
generating geo-fence parameters, wherein the geo-fence parameters comprise one or more alert conditions; and
encoding the geo-fence parameters on a portable storage media comprising a matrix barcode,
wherein the geo-fence parameters are capable of being transferred to a location-enabled mobile device without the network download, and
wherein the location-enabled mobile device issues an alert based on the one or more alert conditions being satisfied.

25. The apparatus of claim 24, wherein the matrix barcode is presented on a passive device that consumes no power.

26. The apparatus of claim 24, wherein the geo-fence parameters comprise a perimeter of the geo-fence.

27. The apparatus of claim 24 wherein the one or more alert conditions comprise one or more of:
entering the perimeter of the geo-fence;
exiting the perimeter of the geo-fence;
remaining within the perimeter of the geo-fence for more than a specified time;
leaving the perimeter of the geo-fence for more than a specified time;
entering the perimeter of the geo-fence during a specified time period; or
exiting the perimeter of the geo-fence during a specified time period.

28. The apparatus of claim 24, wherein the location-enabled mobile device issues the alert to a user of the location-enabled mobile device.

29. The apparatus of claim 24, wherein the location-enabled mobile device issues the alert to a party monitoring the geo-fence.

30. The apparatus of claim 24, wherein the portable storage media is placed adjacent to an area bounded by the geo-fence.

31. The apparatus of claim 24, wherein the location-enabled mobile device is one of a cell phone, a tablet computer, or a personal digital assistant.

32. The apparatus of claim 24, wherein a user of the location-enabled mobile device obtains the location-enabled mobile device from a vendor.

33. The apparatus of claim 24, wherein the location-enabled mobile device is provided to a user by personnel associated with the geo-fence.

34. An apparatus for obtaining a geo-fence without a network download, comprising:
at least one processor of a location-enabled mobile device; and a memory storing instructions that, when executed by the at least one processor, cause the apparatus location-enabled mobile device to perform operations comprising:
reading, a matrix barcode; and
obtaining geo-fence parameters based on the matrix barcode without the network download, wherein the geo-fence parameters comprise one or more alert conditions, and
issuing, by the location-enabled mobile device, an alert based on the one or more alert conditions being satisfied.

35. The apparatus of claim 34, wherein the matrix barcode is displayed on a passive device that consumes no power.

36. The apparatus of claim 34, wherein the geo-fence parameters comprise a perimeter of the geo-fence.

37. The apparatus of claim 34, wherein the one or more alert conditions comprise one or more of:
entering the perimeter of the geo-fence;
exiting the perimeter of the geo-fence;
remaining within the perimeter of the geo-fence for more than a specified time;
leaving the perimeter of the geo-fence for more than a specified time;
entering the perimeter of the geo-fence during a specified time period; or
exiting the perimeter of the geo-fence during a specified time period.

38. The apparatus of claim 34, wherein the issuing comprises issuing the alert to a user of the location-enabled mobile device.

39. The apparatus of claim 34, wherein the issuing comprises issuing the alert to a party monitoring the geo-fence.

40. The apparatus of claim 34, wherein the matrix barcode is placed adjacent to an area bounded by the geo-fence.

41. The apparatus of claim 34, wherein the location-enabled mobile device is one of a cell phone, a tablet computer, or a personal digital assistant.

42. The apparatus of claim 34, wherein a user of the location-enabled mobile device obtains the location-enabled mobile device from a vendor.

43. The apparatus of claim 34, wherein the location-enabled mobile device is provided to a user by personnel associated with the geo-fence.

44. The apparatus of claim 34, wherein the location-enabled mobile device is a mobile device capable of obtaining its geographic position.

45. The apparatus of claim 44, wherein the operations further comprise:
determining a geographic position of the location-enabled mobile device based on a global positioning system (GPS) receiver of the location-enabled mobile device.

46. The apparatus of claim 45, wherein the operations further comprise:
attempting to augment the geographic position based on an accuracy of the geographic position being less than a threshold.

47. An apparatus for providing a geo-fence without a network download, comprising:
logic configured to generate geo-fence parameters, wherein the geo-fence parameters comprise one or more alert conditions; and
logic configured to encode the geo-fence parameters on a portable storage media comprising a matrix barcode,
wherein the geo-fence parameters are capable of being transferred to a location-enabled mobile device without the network download, and
wherein the location-enabled mobile device issues an alert based on the one or more alert conditions being satisfied.

48. An apparatus for obtaining a geo-fence without a network download, comprising:
logic configured to read, by a location-enabled mobile device, a matrix barcode;
logic configured to obtain, by the location-enabled mobile device, geo-fence parameters based on the matrix barcode without the network download, wherein the geo-fence parameters comprise one or more alert conditions; and
logic configured to issue, by the location-enabled mobile device, an alert based on the one or more alert conditions being satisfied.

49. An apparatus for providing a geo-fence without a network download, comprising:
means for generating geo-fence parameters, wherein the geo-fence parameters comprise one or more alert conditions;
means for encoding the geo-fence parameters on a portable storage media comprising a matrix barcode,
wherein the geo-fence parameters are capable of being transferred to a location-enabled mobile device without the network download, and
wherein the location-enabled mobile device issues an alert based on the one or more alert conditions being satisfied.

50. An apparatus for obtaining a geo-fence without a network download,
comprising:
means for reading, by a location-enabled mobile device, a matrix barcode; and
means for obtaining, by the location-enabled mobile device, geo-fence parameters based on the matrix barcode without the network download, wherein the geo-fence parameters comprise one or more alert conditions; and
means for issuing, by the location-enabled mobile device, an alert based on the one or more alert conditions being satisfied.

51. A non-transitory computer-readable medium for providing a geo-fence without a network download, comprising:
at least one instruction to generate geo-fence parameters, wherein the geo-fence parameters comprise one or more alert conditions; and
at least one instruction to encode the geo-fence parameters on a portable storage media comprising a matrix barcode,
wherein the geo-fence parameters are capable of being transferred to a location-enabled mobile device without the network download, and
wherein the location-enabled mobile device issues an alert based on the one or more alert conditions being satisfied.

52. A non-transitory computer-readable medium for obtaining a geo-fence without a network download, comprising:
at least one instruction to cause a location-enabled mobile device to read barcode;
at least one instruction to cause the location-enabled mobile device to obtain geo-fence parameters based on the matrix barcode without the network download, wherein the geo-fence parameters comprise one or more alert conditions; and
at least one instruction to cause the location-enabled mobile device to issue an alert based on the one or more alert conditions being satisfied.

* * * * *